United States Patent
Feeser et al.

(10) Patent No.: US 11,169,820 B1
(45) Date of Patent: *Nov. 9, 2021

(54) MANAGING AN OPERATING SYSTEM TO SET UP A COMPUTER ASSOCIATION TOOL

(71) Applicant: OPEN INVENTION NETWORK LLC, Durham, NC (US)

(72) Inventors: Colin Lee Feeser, Atlanta, GA (US); Robert Moore Gilbert, Moody, AL (US); Richard A. Paul, Jr., Birmingham, AL (US); Robert Keith Cahoon, Helena, AL (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 197 days.

This patent is subject to a terminal disclaimer.

(21) Appl. No.: 16/581,666

(22) Filed: Sep. 24, 2019

Related U.S. Application Data

(63) Continuation of application No. 15/096,965, filed on Apr. 12, 2016, now Pat. No. 10,423,426, which is a continuation of application No. 13/118,623, filed on May 31, 2011, now Pat. No. 9,311,104.

(60) Provisional application No. 61/354,411, filed on Jun. 14, 2010.

(51) Int. Cl.
  *G06F 9/4401* (2018.01)
  *H04L 12/24* (2006.01)

(52) U.S. Cl.
  CPC .......... *G06F 9/4416* (2013.01); *G06F 9/4401* (2013.01); *G06F 9/4406* (2013.01); *H04L 41/22* (2013.01)

(58) Field of Classification Search
  CPC .... G06F 9/4416; G06F 9/4401; G06F 9/4406; H04L 41/22
  See application file for complete search history.

(56) References Cited

U.S. PATENT DOCUMENTS

| | | |
|---|---|---|
| 7,363,514 B1 | 4/2008 | Behren |
| 7,395,324 B1 | 7/2008 | Murphy et al. |
| 7,814,126 B2 | 10/2010 | Prabu et al. |
| 8,046,450 B1 | 10/2011 | Schloss et al. |

(Continued)

OTHER PUBLICATIONS

Anonymous, System Center Configuration Manager 2007 Guide (OSD Guide), Version 1.0.0.0 Baseline, Friday, 26 2010.

(Continued)

*Primary Examiner* — Aurel Prifti

(57) ABSTRACT

Certain aspects of the present disclosure relates to processing managing an operating system to set up a computer association tool. The technique includes processing an Operating System Deployment (OSD) functionality of a Microsoft System Center Configuration Manager (SCCM) to configure a server, wherein the OSD causes the server to a Pre-boot Execution Environment (PXE Boot). The SCCM may be launched for the PXE boot process to be associated with the server and configuring the SCCM to associate with a specific OSD Task Sequence. Boot from a Network Interface Card (NIC) that has an associated MAC address, using the PXE, wherein the PXE boot process then hands the operation over to the designated OSD Task Sequencer (TS) which handles the configuration process according to at least one variable.

20 Claims, 5 Drawing Sheets

(56) References Cited

U.S. PATENT DOCUMENTS

| | | | |
|---|---|---|---|
| 8,086,659 B2 | 12/2011 | Steeb et al. | |
| 8,676,958 B1* | 3/2014 | Hendon | H04L 43/0817 709/224 |
| 9,311,104 B1* | 4/2016 | Feeser | G06F 8/63 |
| 9,336,009 B1* | 5/2016 | Feeser | G06F 9/4416 |
| 10,102,009 B1* | 10/2018 | Feeser | G06F 9/4416 |
| 10,423,426 B1* | 9/2019 | Feeser | H04L 41/22 |
| 2002/0116484 A1* | 8/2002 | Podracky | H04L 43/0811 709/223 |
| 2004/0267716 A1* | 12/2004 | Prabu | G06F 8/61 |
| 2004/0268292 A1* | 12/2004 | Steeb | G06F 9/44505 717/100 |
| 2006/0129788 A1 | 6/2006 | Maeda et al. | |
| 2006/0155749 A1* | 7/2006 | Shankar | G06F 9/4416 |
| 2007/0028123 A1* | 2/2007 | Lindley | G06F 9/4416 713/300 |
| 2007/0239861 A1 | 10/2007 | Reeves et al. | |
| 2007/0266120 A1 | 11/2007 | Tallieu et al. | |
| 2008/0141015 A1 | 6/2008 | Chalemin et al. | |
| 2008/0155245 A1* | 6/2008 | Lipscombe | G06F 9/4416 713/2 |
| 2008/0263192 A1 | 10/2008 | Murphy et al. | |
| 2009/0037353 A1 | 2/2009 | Greenwald et al. | |
| 2009/0038353 A1 | 2/2009 | Keightley | |
| 2009/0144532 A1 | 6/2009 | Arafeh | |
| 2009/0172136 A1* | 7/2009 | Schulz | G06F 9/4416 709/222 |
| 2009/0319766 A1 | 12/2009 | Ward et al. | |
| 2009/0327465 A1 | 12/2009 | Flegg et al. | |
| 2010/0115077 A1 | 5/2010 | Tameshige et al. | |
| 2010/0192145 A1 | 7/2010 | Liles et al. | |
| 2010/0262815 A1* | 10/2010 | Bozek | G06F 9/4416 713/1 |
| 2010/0279673 A1 | 11/2010 | Sharp et al. | |
| 2013/0290542 A1 | 10/2013 | Watt et al. | |
| 2014/0075031 A1 | 3/2014 | Doering et al. | |
| 2015/0096011 A1 | 4/2015 | Watt | |
| 2017/0171021 A1 | 6/2017 | Angalur et al. | |

OTHER PUBLICATIONS

Wikipedia, "Network Interface Card", Initially in the early 1990s, pp. 1-3.

Wikipedia, "Preboot Execution Enviroment", Initially published by Intel 1999, p. 1.

* cited by examiner

MANAGING AN OPERATING SYSTEM TO SET UP A COMPUTER ASSOCIATION TOOL

FIELD OF THE INVENTION

The disclosed embodiments relate generally to a computer managing an operating system, and more particularly, to a method and apparatus to develop a computer association tool to insure that a correct parameter is associated with a correct server when deploying a new system.

BACKGROUND OF THE INVENTION

Every day, new servers are being placed into production or old servers are coming off or replaced. For the most part, these servers/machines are each built by hand even though many automation scripts have been developed to improve this process. Many companies offer a unique process to automate server building from a bare metal machine that produces ready using OSD (Operating System Deployment). While the process works great, the manner for associating a particular computer with the process was found difficult to perform and allowed for possible errors in completing.

What is needed is a tool that provides an easy interface which generates correct input/output and provides a standard server design capability. A process that offers a faster, more uniform method of building servers in a nearly hands free environment. The tool that can interface with most servers and an analyst can configure a new server. The result is a standard production server with little room for errors, reliable, built in about an hour rather than days.

Therefore, present invention disclosure describes such a tool that improves usability of the above mentioned applications.

SUMMARY OF THE INVENTION

Certain aspects of the present disclosure provide a method for processing managing an operating system to set up a computer association tool. The method generally includes processing an Operating System Deployment (OSD) functionality of a Microsoft System Center Configuration Manager (SCCM) to configure a server, wherein the OSD causes the server to a Pre-boot Execution Environment (PXE Boot), launching the SCCM for the PXE boot process to be associated with the server and configuring the SCCM to associate with a specific OSD Task Sequence, booting from a Network Interface Card (NIC) that has an associated MAC address, using the PXE, wherein the PXE boot process then hands the operation over to the designated OSD Task Sequencer (TS) which handles the configuration process according to at lest one variable.

Certain aspects of the present disclosure provide an apparatus to process manage an operating system to set up a computer association tool. The apparatus generally includes at least one processor and a memory coupled to the at least one processor. The processor is generally configured to the at least one processor configured to process an Operating System Deployment (OSD) functionality of a Microsoft System Center Configuration Manager (SCCM) to configure a server, wherein the OSD causes the server to a Pre-boot Execution Environment (PXE Boot); launch the SCCM for the PXE boot process to be associated with the server; configure the SCCM to associate with a specific OSD Task Sequence; boot from a Network Interface Card (NIC) that has an associated MAC address, using the PXE, wherein the PXE boot process then hands the operation over to the designated OSD Task Sequencer (TS) which handles the configuration process according to at lest one variable; and a memory coupled to the at least one processor.

Certain aspects of the present disclosure provide a computer-program product for processing managing an operating system to set up a computer association device, the computer-program product including a computer-readable medium including code for processing an Operating System Deployment (OSD) functionality of a Microsoft System Center Configuration Manager (SCCM) to configure a server, wherein the OSD causes the server to a Pre-boot Execution Environment (PXE Boot); launching the SCCM for the PXE boot process to be associated with the server; configuring the SCCM to associate with a specific OSD Task Sequence; and booting from a Network Interface Card (NIC) that has an associated MAC address, using the PXE, wherein the PXE boot process then hands the operation over to the designated OSD Task Sequencer (TS) which handles the configuration process according to at lest one variable.

BRIEF DESCRIPTION OF THE DRAWINGS

In the accompanying figures, similar reference numerals may refer to identical or functionally similar elements. These reference numerals are used in the detailed description to illustrate various embodiments and to explain various aspects and advantages of the present disclosure.

Figure 1:
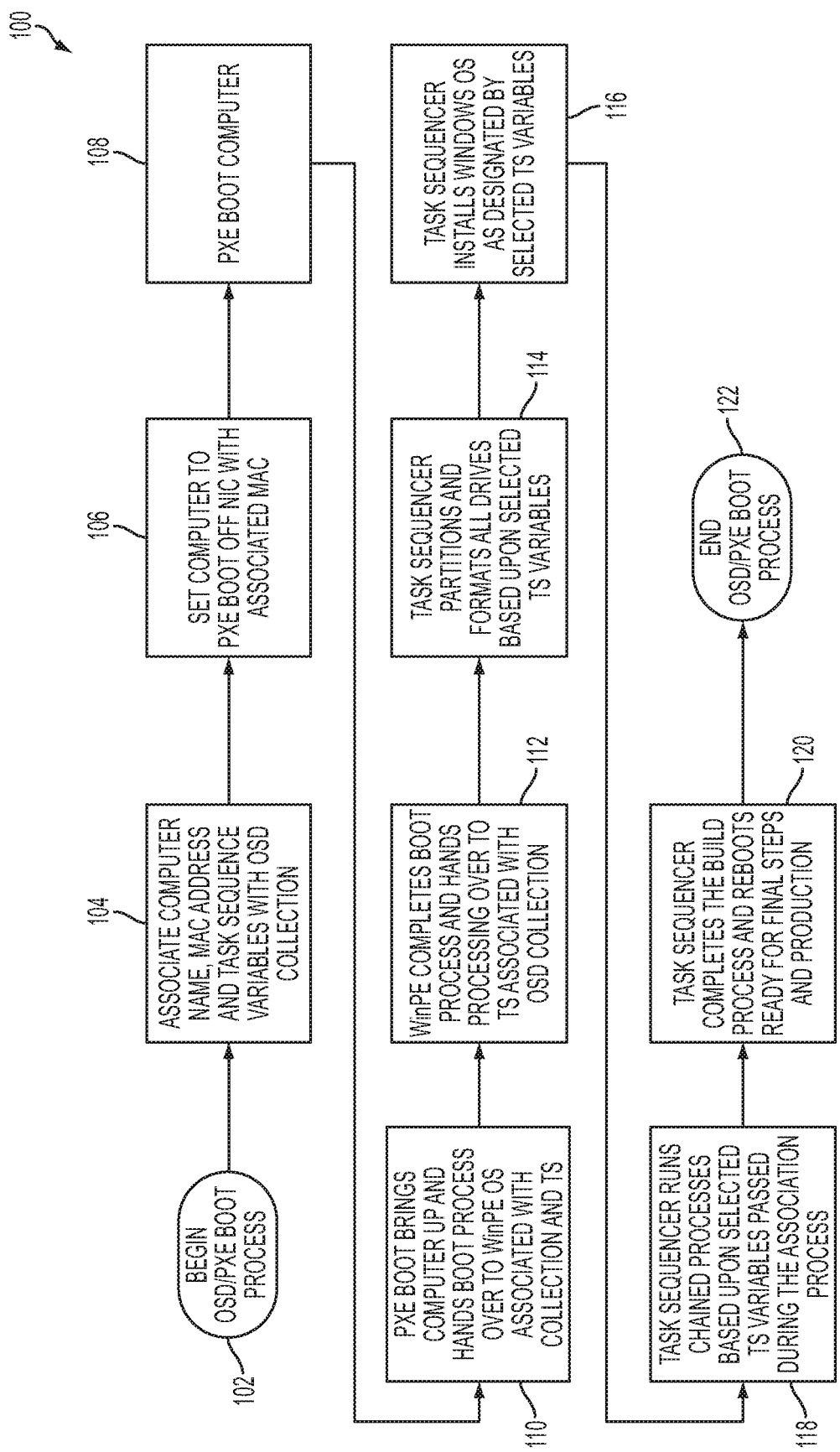
FIG. 1 illustrates a functional block diagram illustrating Microsoft's® System Center Configuration Manager (SCCM)™ Operating System Deployment (OSD)™ Task Sequencer (TS) process flow in accordance with certain aspects of the disclosure.

The foregoing summary, as well as the following detailed description of certain embodiments of the present invention, will be better understood when read in conjunction with the appended drawings. The drawings illustrate diagrams of the functional blocks of various embodiments. The functional blocks are not necessarily indicative of the division between hardware circuitry. Thus, for example, one or more of the functional blocks (e.g., processors or memories) may be implemented in a single piece of hardware (e.g., a general purpose signal processor or a block or random access memory, hard disk, or the like). Similarly, the programs may be stand alone programs, may be incorporated as subroutines in an operating system, may be functions in an installed imaging software package, and the like. It should be understood that the various embodiments are not limited to the arrangements and instrumentality shown in the drawings.

DETAILED DESCRIPTION

It should be observed that apparatus parts and components have been represented by conventional symbols in the drawings, showing only specific details that are relevant for an understanding of the present disclosure. Further, details that may be readily apparent to person ordinarily skilled in the art may not have been disclosed.

Aspects of the present invention may be used in a computer association tool with a display or a graphical user interface (GUI) to insure that a correct parameter is associated with a correct server when deploying a new system.

In an embodiment of the invention, the computer association tool is designed to be highly flexible so that however a company decides to configure a task sequencer, the tool can be modified using a database to follow and pass an appropriate variable to a server. The association of a Media Access Address (MAC) address with a Systems Management Server (SMS) Unique Identifier and a Resource ID in the assigned Pre-boot Execution Environment (PXE Boot) Microsoft's® System Center Configuration Manager (SCCM)™ collection is one of the key components of the tool. The tool can add the association in the assigned collection and remove it when the process is completed. All is done without having to load the oversized SCCM Console which handles the incredibly huge number of tasks that SCCM is capable of doing.

Aspects of the present invention can be used to a Configuration Manager Computer Association Tool (CMCA), the CMCA is a utility that can be used to manage the computer association tasks for Microsoft's® System Center Configuration Manager (SCCM)™ Operating System Deployment (OSD)™ Task Sequencer (TS).

In certain aspect of the present invention, the CMCA may be a type of framework that surrounds MS SCCM OSD and provides a pre processor GUI that enhances the success of deploying a bare bones computer system (can be a server or a client) and speeds up the process of deploying a new system rather then having an administrator create a manual comma delimited file and hoping the admin gets it right the first time. The output may be a set of tasks with the appropriate set of parameters unlike the output provided by MS SCCM OSD system.

Earlier the MS SCCM OSD system only allowed for one system deployment with no flexibility, so MS SCCM OSD has to be changed for each deployed system or whenever the OS being deployed or its options change. A pre-processor that adds parameters to a system that doesn't handle parameters by sequencing individual commands to the engine (SCCM OSD task sequencer) would take longer to deploy a system, so the improvement of the invention results in a time savings to deploy the system.

In a certain aspect of the present invention, the computer CMCA has the ability to cause a computer to PXE boot using its WDS (Windows Deployment Service). Once the computer PXE boots OSD hands it a sequence of pre-configured tasks to run. These tasks are configured in the SCCM OSD section called the Task Sequencer. In the Task Sequencer a user can configure every type of computer build/configuration as desired and cause the process to branch by passing variables.

By using the above information and as will be explained in detail below it is possible to build/configuration computers from bare metal out of the box to full production systems. Ideally, even if the user have multiple build types, one Task Sequencer can handle all builds based upon which variables are passed at the association phase. The exception is that the user need one task sequencer for x64 and one for x86 machines because the task sequencer also has to be associated with a version (x64/x86) of Windows PE which is handed off by the PXE boot process. The attached flow chart FIG. 1 covers details of the OSD PXE boot process.

In certain aspects, it is possible that using API's and WMI the user can import the information directly into SCCM and in doing so the user could also provide a front end build/configuration design tool that can be used by either the server configuration analyst or the engineer to design a server and place it into ready mode so all the analyst has to do is plug the server into the network and turn it on. Once configured by the present invention tool, SCCM/OSD may cause the server to PXE boot and run through the task sequencer following the path set by the passed variables and come out a completed production server. The configuration process can be completed in a remarkable lesser amount of time.

With reference to FIG. 1, an exemplary flow diagram 100 suitable for implementing various portions of the present invention is shown. The flow diagram relates to the functionality of CMCA to the OSD computer association process. At step 102, the OSD functionality of SCCM can configure a server from the Pre-boot Execution Environment (PXE Boot). This can be achieved by associating a computer name, the Media Access Address (MAC) and a series of variables which identify processes to run in the Task Sequencer, step 104. The Task Sequencer may contain a list validated processes to run in order to configure a server from bare metal all the way to a completely customized server ready for production. Each step or at least how the step is called can be referenced by a variable which is associated to the MAC at the time the association is added to the SCCM collection. This association can be done manually from the SCCM console under the OSD tree node and further under the Computer Association tree node. For Example, by selecting a node may give at least two methods to add a computer association using the 'New' menu selection or the 'Import Computer Information' menu selection. The CMCA may handle this association process outside of the SCCM console in a very controlled manner.

As shown in FIG. 1, steps 102-122 disclose that the OSD requires the Microsoft® Windows Deployment Service™ to be running in order for the PXE boot process to work. A special collection in SCCM may be established or launched in order for the PXE boot process to be associated with a particular machine in a managed manner. This SCCM collection may also be associated with a specific advertised OSD Task Sequence including but not limited to associate computer name, MAC address, and Task Sequence variables with OSD collection.

Once a computer is associated with this collection, the computer can be booted from the Network Interface Card (NIC), which has the associated MAC address, using PXE. Because the advertised Task Sequence (TS) is also associated with this MAC address, the boot process may be handed off to a Windows Pre-installation Environment (Windows PE) operating system to boot up the machine. The Windows PE boot process then hands the operation over to the designated OSD Task Sequencer which handles the configuration process according to the variables which were passed during the computer association process. The TS partitions and formats all drives based upon selected TS variables. The TS installs the operating system such as Windows OS as designated by selected TS variables. The TS further runs a chained process based upon selected TS variables during the association process. The TS may complete the build/configuration up process and reboots for the final step and production. The PXE boot/OSD process comes to an end for competition.

Figure 2:
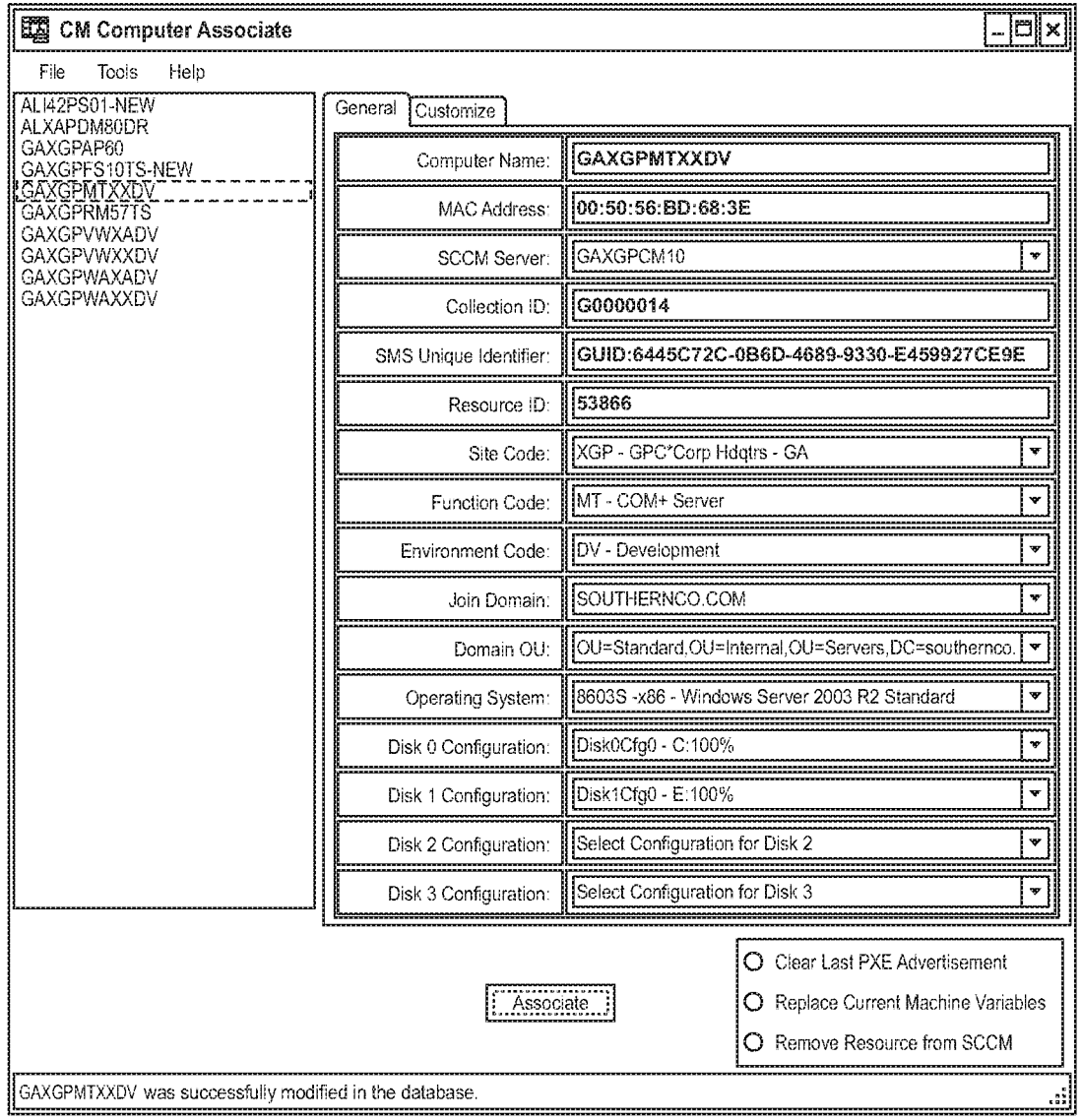
FIG. 2 illustrates a flow diagram for a Configuration Manager Computer Association Tool (CMCA) in accordance with certain aspects of the disclosure.

In one embodiment, CMCA performs the following tasks such as but not limited to, forces the server name into a designated format. With reference to FIG. 2, the server name must match a configurable minimum length set in configuration file (This format function can be bypassed using a certain key combination). The server name must conform to a predefined coded format following the convention of at least 2 character state, at least 3 character site code, at least 2 character function code, at least 2 character numeric code, and at least 2 character optional environment code (The variables passed to OSD can make use of these codes). The server name cannot exist in Active Directory (Must be unique on the network).

According to certain aspects of the invention, as shown in FIG. 2, accept the MAC address in a specific format usable by OSD and attempt to auto-select the correct SCCM site server where the collection may be associated. This is currently done by matching at least the first 5 characters of the name. It is possible that CMCA may attempt to match this site server based upon SCCM site code APIs. In an embodiment, auto-populates the Site Code, Function Code, Environment Code drop downs based upon the Server Name. These can also be manually selected. The CMCA allows for the selection of the domain to be joined during the configuration process, allows for the selection of the Domain Organizational Unit (OU) for the machine to be added to when the domain is joined, allows for the selection of which Operating System may be installed at configuration time.

In certain aspect, as shown in FIG. 2, the selection of the Operating System and the SCCM Site Server may auto-populate the SCCM Collection ID (This relationship is currently set in the configuration file but should be handled by the SCCM site code APIs in a future release). This allows for the selection of partitioning and formatting up to four disk drives according to a predetermined standard (This selection may be stored in the database).

As shown in FIG. 2 everything mentioned thus far may be applied to all server configurations and are contained on a tab named, "General". There is another tab named "Customize", which offers further customizations based upon servers, such as but not limited to Citrix server configurations, including UniPrint, Server Role codes, Reuse (COM) installation, and Server Class. All server configurations data may be stored in a database for future use.

Once the server build/configuration selection is completed by filling in the above information, the "Associate" button appears at the bottom of the form as shown in FIG. 2. Clicking "Associate" button may associate the computers name, MAC address and variable configuration selections with the SCCM Site Server Collection ID and return a SMS Unique Identifier as well as a Resource ID. This may auto-populate in the appropriate fields on the form and stored in the database with the server name.

As shown in FIG. 2, once the server has been associated, a box with radio buttons may appear to the right of the "Associate" button. These radio buttons offer the following functionality: Clear the last PXE advertisement from SCCM so the PXE boot process can be run again in the event of a configuration failure. Replace the Current Machine Variables in SCCM, should they change after the Association has been performed. Remove the computer Resource from the SCCM collection once the configuration process has completed.

In certain aspect, more options are available using the menu selections at the top of the tool, such as but not limited to a File/New Server may clear the form for inputting a new server's information, a File/Exit may exit the tool, a Tools/Clear Selected Resource (this tool only) may remove the selected server information from the database, a Tools/Delete Selected Resource from SCCM (grey out) may perform the same function as the above mentioned radio button, and a Help/About may display information about the tool.

The CMCA may require a database to be configured to match using computer-readable instructions to connect and at least a query string in a configuration file. The data populated from a database may include but not limited to a Site Codes, a Function Codes, a Environment Codes, a Server Role Codes, a Disk Configuration codes for disks one through 4 (0-3).

When CMCA is first installed, it may pull the required information from the database and from the configuration file to pre-populate the form. For Example, on the left hand side of the form there may be a list of the servers which have already been entered into the database. By clicking on one of these servers may auto-populate the server configuration selection data as it was last stored in the database. If the user does not click on one of the existing servers, the user may have to begin filling in a new server with its configuration requirements or the user can begin typing the name of an existing CMCA server and when the user tabs/clicks to the next field it may automatically find the server name on the left and auto-populate the server configuration data for that server.

FIG. 3a-3e illustrates steps for adding a new server to the CMCA, this includes at least entering a server name. When a server is not selected on the left hand side because the user have just opened the application, or have selected, "File/New Server" from the menu selection, the user may begin entering information for a new server. A curser may default to the Computer Name field. The user may begin typing in the server name. After typing the first five characters of the server name, the two drop down fields for SCCM Server and Site Code may auto-populate if a matching server or code is found in the list. By the same measure, at least when as the next two characters are typed, the function code is selected matched in the drop down and the last two environment codes, if used, are matched.

Figure 3A:
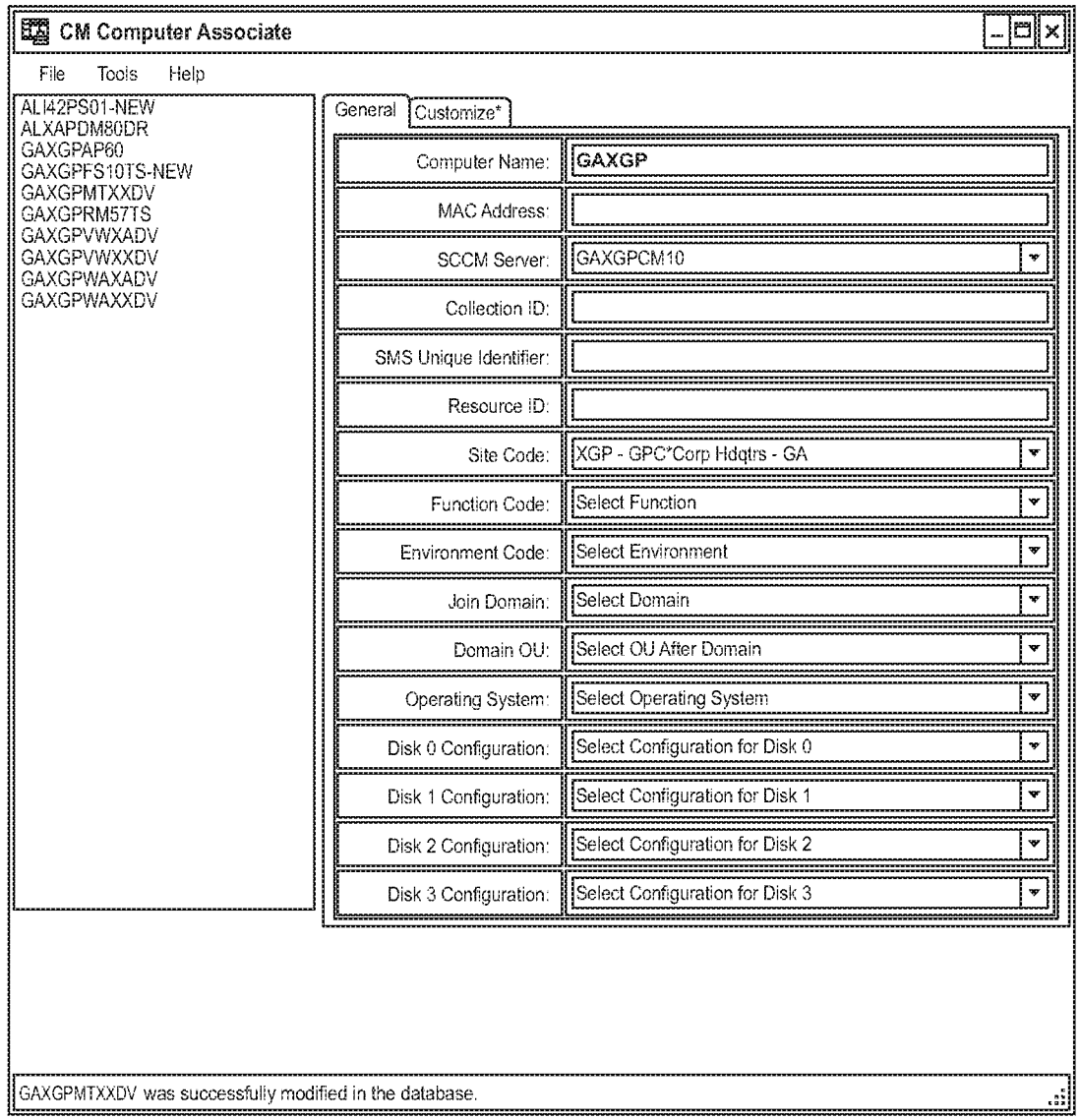
FIG. 3a-3e illustrates a flow diagram for using the Configuration Manager Computer Association Tool (CMCA) in accordance with certain aspects of the disclosure.
Figure 3B:
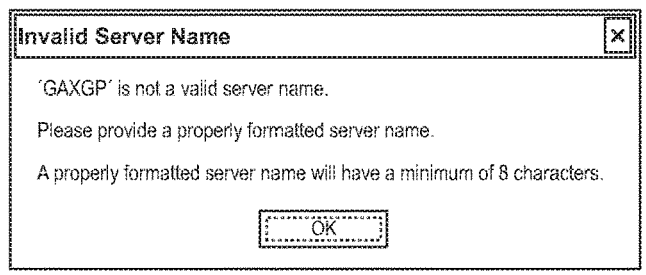
Figure 3C:
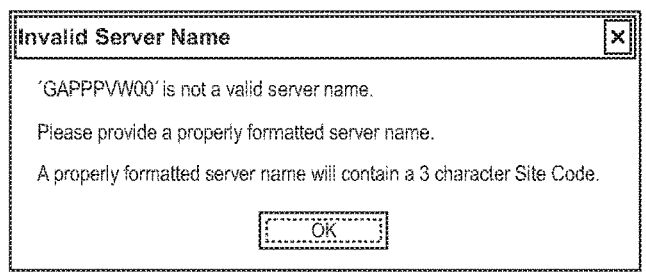
Figure 3D:
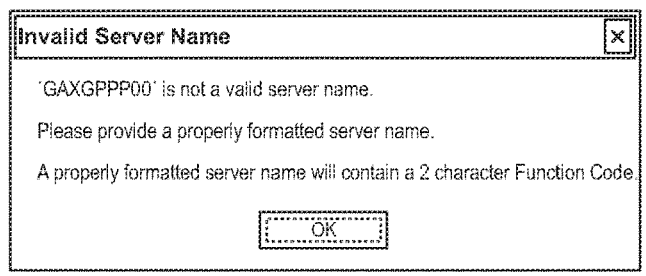
Figure 3E:
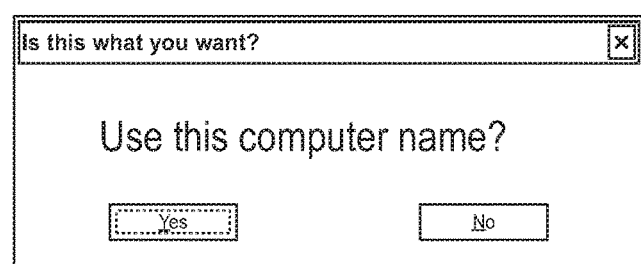

If the server name is too short based upon the setting in the configuration file, the user may be prompted with a message box as shown in FIG. 3b. In embodiment of the invention, the server name formatting rules can be bypassed by holding down the control key (ctrl) and clicking the server name field. If at lest the third through fifth characters do not match a site code ID, the user may be prompted with a message box as shown in FIG. 3c. If at least the sixth through the seventh characters do not match a valid function code, the user may be prompted with a message box as shown in FIG. 3d. Upon exiting the Computer Name field, if the name follows appropriate standards or the bypass formats has been used, the user may be prompted with a message box as shown in FIG. 3e. If the user selects "yes", the name may be added to the ServerList on the left and the curser may be moved to the MAC Address Field if the user uses the tab key, otherwise the field is selected by clicking on it.

Aspect of the invention may include entering the MAC Address. The user can tab/click to the next field from Computer Name or click on the MAC Address field to place the curser in the MAC Address field. The MAC Address is made up of a set of hexadecimal characters broken into two sets of characters separated by a colon. While other formats for the MAC Address exists, SCCM accepts the colon delimited format so, CMCA locks us into this. As the user enters each at least a set of two characters, CMCA may auto-populate the colons in the proper locations. If a character that does not conform to the hexadecimal specification is attempted to be placed in this field it may be blocked. This field may only hold the number of character as conforms to the MAC address standard. In certain aspect, the user can paste a MAC address into the MAC address field by using the shift/insert key combination after the address has been copied into the buffer.

Aspect of the invention may include entering the SCCM Server. If the SCCM Server selection is correct, the user may proceed to the "Join Domain" field. If the SCCM Server selection is not correct, the user may click on the arrow to the right of the drop down box and pick the correct SCCM server. If the SCCM Server, the user may need this configuration process does not exist in the drop down list, the user may type in the correct SCCM Server name. In certain aspect of the invention, if the SCCM Server, the user may need for this configuration does not exist in the dropdown list, the user may also need to type in the proper Collection ID that corresponds to the Operating System and SCCM Server.

Aspect of the invention may include entering the Domain field. In most cases the domain selection may default to the most common infrastructure domain. But, if it is incorrect or unselected, the user must select it from the drop down list.

Aspect of the invention may include entering the Domain OU. Once the Domain has been selected, the tool may query that domain for the available list of Organizational Units so that by the time the user may get to the Domain OU drop down box, the complete list is available to select. If the user does not select an OU, the server may be placed in the default folder.

Aspect of the invention may include selecting the Operating System. By selecting the correct operating system to have installed on the server. Doing so, should auto-populate the Collection ID, if the SCCM server has been selected.

Aspect of the invention may include selecting Disk Configurations. There may be four Disk Configuration drop down boxes for configuring disks zero through three. Only select configurations for existing disks. Most configurations are provided in percentages, only select the one that fits the best scenario.

Aspect of the invention may include making Custom Settings. Certain Function codes may match Role Codes contained on the Customize tab. If they do, the Role Codes may auto-populate. In that case, there may be other selections which need to be made on the Customize tab and the tab itself may display an asterisk next to the word "Customize". If a server is assigned a role code, it usually may require more information as to how it needs to be built out, such as installing IIS, Oracle Client, DB2Connect, reuse components, etc. Simply complete the selections according to the build/configuration request.

Aspect of the invention may include saving the Server to the Database. Throughout the process of filling out the form, the user may notice a button on the bottom left of the form labeled, "Save". There may also be a prompt above the button, in red, saying, "*ServerName not saved*". Clicking the button may save the server configuration to the database. The user may alternatively wait until the configuration is completed and click "Associate" and the computer may both be associated with the selected collection and SCCM server as well as be saved to the database. The "Save" button and the prompt may go away when the database matches the server configuration.

Aspect of the invention may include associating the Computer to the SCCM Collection. The minimum requirement for the server to be associated for an OSD configuration is to have the server name, MAC address, SCCM Server, Collection ID, Domain, Operating System and at least one disk configuration selected. When all of these are complete, the "Associate" button may appear at the bottom of the form. Clicking or selecting this button should complete the association and supply the SMS Unique ID and the Resource ID information to their corresponding fields. The user may be prompted for credentials to complete the association. Simply supply the appropriate credentials in the domain/username format along with the user password. If these two fields are properly populated, the server should be ready to PXE boot. If there is an error in the MAC address, SCCM Server or Collection ID the user may receive a message stating the error.

If the Server Name, MAC address or SMS Unique ID already exists anywhere in SCCM, the user may receive a message stating such and the SMS Unique ID and the Resource ID information corresponding to the rogue server may be populated to their corresponding fields. The user may use the SMS Unique ID (SMSUI) to search for the server in the "All Systems" collection on the top most SCCM server in the hierarchy to locate the rogue server name and remove it. The user can also, attempt to remove the resource by clicking on the "Remove Resource from SCCM" radio button which should appear when the SMSUI and Collection ID are populated. Then click the Associate button to remove the resource. This may at least clear the SMSUI and Collection ID fields, allowing the user to try again. If this doesn't work the user may need to follow the process above by clearing the resource from "All Systems".

Aspect of the invention may include replacing Current Machine Variables. If the user have already successfully made the computer association in SCCM and the SMSUI and Collection ID fields are populated the user may have a box on the bottom right of the tool with three radio buttons in them. If the user have not already turned on the server and begun the PXE boot process, the user may still change the configuration settings and update the server collection with the new variables by selecting the middle radio button labeled, "Replace Current Machine Variables" and clicking Associate again.

Aspect of the invention may include clearing Last PXE Advertisement. The PXE boot process may only run one time per machine. However, if an issue arises where the process does not complete, the user may wish to try again. In that case, click the first radio button labeled, "Clear Last PXE Advertisement" and click Associate again. This may reset the PXE process so that the server should pick it up again.

Aspect of the invention may include removing Resource from SCCM. Once the server configuration process is complete, the user may wish to remove the server from the collection to prevent the advertisement from running again. Theoretically this should not happen, but it is a good practice to remove the server from the collection anyway.

Aspect of the invention may include removing the Server from the Database. As a matter of best practice the user or an administrator may wish to keep the server configuration database clean. Alternatively the user may wish to keep the database as a record of server build/configuration activity. In the case, of wanting to keep the database clean, simply go to the menu selection, "Tools/Clear Selected Resource (this tool only)" and the user may be prompted to remove the server from the database. It is a good idea to remove the resource from SCCM, first.

Figure 4:
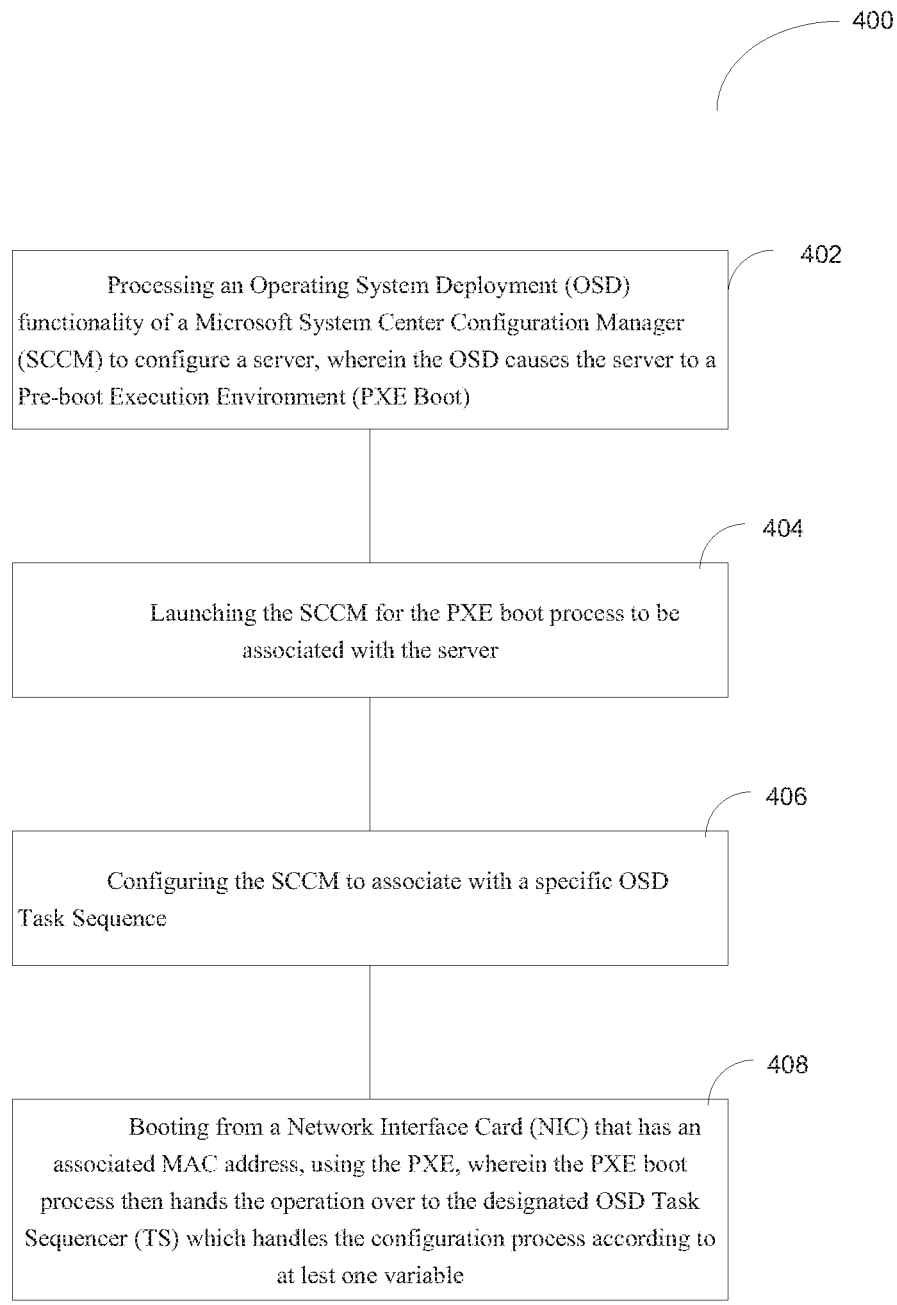
FIG. 4 is a flow chart illustrating a process of a system performing action in response to an instruction in accordance certain aspects of the present disclosure.

FIG. 4 is an example of a flow diagram illustrating a process 400 of a system performing action in response to an instruction in accordance certain aspects of the present disclosure.

Process 400 begins at 402 by processing an Operating System Deployment (OSD) functionality of a Microsoft System Center Configuration Manager (SCCM) to configure a server, wherein the OSD causes the server to a Pre-boot Execution Environment (PXE Boot). At 404, launching the SCCM for the PXE boot process to be associated with the server. At 406, configuring the SCCM to associate with a specific OSD Task Sequence and at 408, booting from a Network Interface Card (NIC) that has an associated MAC address, using the PXE, wherein the PXE boot process then hands the operation over to the designated OSD Task Sequencer (TS) which handles the configuration process according to at lest one variable.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage or a database media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method, comprising:
   processing an Operating System Deployment (OSD) functionality of a System Center Configuration Manager (SCCM) to configure a server;
   launching the SCCM for a Pre-boot Execution Environment (PXE Boot) process to be associated with the server; and
   configuring the SCCM to associate with a specific OSD Task Sequence;
   wherein the PXE boot process then hands the operation over to the designated OSD Task Sequencer (TS) which handles the configuration process according to at least one variable that references how each step of the configuration process is called, the at least one variable being manually associated with a Media Access Address (MAC) address at a time the manual association is added to the SCCM.

2. The method of claim 1, wherein the OSD requires a Deployment Service to be running in order for the PXE boot process to work.

3. The method of claim 1, wherein combination of the SCCM may be established in order for the PXE boot process to be associated with a particular machine.

4. The method of claim 1, wherein the OSD functionality of the SCCM includes configuring the server from the Pre-boot Execution Environment (PXE Boot), further including associating a computer name, the Media Access Address (MAC) and the at least one variable that identifies a processes to run in the Task Sequencer (TS).

5. The method of claim 1, wherein the SCCM includes associating with a specific advertised OSD Task Sequence including the associated computer name, the MAC address, and the Task Sequence variable with the OSD.

6. The method of claim 1, wherein the SCCM OSD may cause the server to PXE boot and run through the TS following a path set by a passed variable.

7. The method of claim 1, wherein a Configuration Manager Computer Association (CMCA) is a utility that can be used to manage a computer association tasks for the System Center Configuration Manager (SCCM) Operating System Deployment (OSD) Task Sequencer (TS).

8. The method of claim 7, wherein the CMCA surrounds the SCCM OSD.

9. The method of claim 7, wherein the CMCA provides a pre processor graphical user interface.

10. The method of claim 1, further comprising associating the Media Access Address (MAC) address with a Systems Management Server (SMS) Unique Identifier and a Resource ID in the assigned Pre-boot Execution Environment (PXE Boot) System Center Configuration Manager (SCCM).

11. The method of claim 1, wherein using an application programming interface and windows management instrumentation the user can import any information directly into the SCCM.

12. The method of claim 5, wherein the advertised OSD TS is associated with the MAC address, the boot process may be handed off to a Pre-installation Environment operating system to boot up the machine.

13. An apparatus, comprising:
   at least one processor configured to:
      process an Operating System Deployment (OSD) functionality of a System Center Configuration Manager (SCCM) to configure a server;
      launch the SCCM for a Pre-boot Execution Environment (PXE Boot) process to be associated with the server; and
      configure the SCCM to associate with a specific OSD Task Sequence;
      wherein the PXE boot process then hands the operation over to the designated OSD Task Sequencer (TS) which handles the configuration process according to at least one variable that references how each step of the configuration process is called, the at least one variable being manually associated with a Media Access Address (MAC) address at a time the manual association is added to the SCCM;
   a memory coupled to the at least one processor.

14. The apparatus of claim 13, wherein the OSD requires a Deployment Service to be running in order for the PXE boot process to work.

15. The apparatus of claim 13, wherein combination of the SCCM may be established in order for the PXE boot process to be associated with a particular machine.

16. The apparatus of claim 13, wherein the OSD functionality of the SCCM includes configuring the server from the Pre-boot Execution Environment (PXE Boot), further including associating a computer name, the Media Access Address (MAC) and the at least one variable that identifies a processes to run in the Task Sequencer (TS).

17. The apparatus of claim 13, wherein the SCCM includes associating with a specific advertised OSD Task Sequence including the associated computer name, the MAC address, and the Task Sequence variable with the OSD.

18. The apparatus of claim 13, wherein the SCCM OSD may cause the server to PXE boot and run through the TS following a path set by a passed variable.

19. A non-transitory computer-program product comprising:
   a computer-readable medium comprising code for:
      processing an Operating System Deployment (OSD) functionality of a System Center Configuration Manager (SCCM) to configure a server;
      launching the SCCM for a Pre-boot Execution Environment (PXE Boot) process to be associated with the server; and
      configuring the SCCM to associate with a specific OSD Task Sequence;
      wherein the PXE boot process then hands the operation over to the designated OSD Task Sequencer (TS) which handles the configuration process according to at least one variable that references how each step of the configuration process is called, the at least one variable being manually associated with a Media Access Address (MAC) address at a time the manual association is added to the SCCM.

20. The non-transitory computer-program product of claim 19, wherein the OSD functionality of the SCCM includes configuring the server from the Pre-boot Execution Environment (PXE Boot), further including associating a computer name, the Media Access Address (MAC) and the at least on variables that identifies a processes to run in the Task Sequencer (TS).

* * * * *